United States Patent
Kelsch et al.

(10) Patent No.: US 12,264,509 B1
(45) Date of Patent: *Apr. 1, 2025

(54) MERCHANDISE ANTI-THEFT DEVICE WITH A QUICK-RELEASE MECHANISM

(71) Applicants: Christopher A. Kelsch, Palm Harbor, FL (US); Vanguard Products Group, Inc., Oldsmar, FL (US)

(72) Inventors: Christopher A. Kelsch, Palm Harbor, FL (US); Jasen Paul Biggins, Garner, NC (US); Lee Eckert, Sarasota, FL (US); John N. Figh, Jr., Oldsmar, FL (US); Matthew Kuntz, Tucson, AZ (US); Wade Zhu, Westchase, FL (US)

(73) Assignee: Vanguard Products Group, Inc., Oldsmar, FL (US)

( * ) Notice: Subject to any disclaimer, the term of this patent is extended or adjusted under 35 U.S.C. 154(b) by 276 days.

This patent is subject to a terminal disclaimer.

(21) Appl. No.: 17/730,873

(22) Filed: Apr. 27, 2022

Related U.S. Application Data

(63) Continuation-in-part of application No. 17/370,442, filed on Jul. 8, 2021, now Pat. No. 11,319,731.

(Continued)

(51) Int. Cl.
  *E05B 73/00* (2006.01)
  *A47F 7/024* (2006.01)
  (Continued)

(52) U.S. Cl.
  CPC ........ *E05B 73/0082* (2013.01); *A47F 7/0246* (2013.01); *F16M 11/041* (2013.01);
  (Continued)

(58) Field of Classification Search
  CPC .. E05B 73/00; E05B 73/0017; E05B 73/0047; E05B 73/0082; A47F 7/0246;
  (Continued)

(56) References Cited

U.S. PATENT DOCUMENTS

| | | | | |
|---|---|---|---|---|
| 3,633,151 A | * | 1/1972 | Sensabaugh | H01R 13/22 439/333 |
| 4,066,231 A | * | 1/1978 | Bahner | F16M 13/00 70/229 |

(Continued)

OTHER PUBLICATIONS

VanguardProtexGlobal.com Installation Guide; Tablet Quick Disconnect Bracket ( K-TABQD-BKT) Sep. 8, 2012.

(Continued)

*Primary Examiner* — Christopher Garft
*Assistant Examiner* — Michael McDuffie
(74) *Attorney, Agent, or Firm* — Andriy Lytvyn; Hill Ward Henderson, P.A.

(57) ABSTRACT

An anti-theft device for securing an article of merchandise against unauthorized removal from a display counter. The anti-theft device comprises a latch plate and a quick-release interface. The latch plate is configured to selectively couple to the quick-release interface. A latch is disposed within the quick-release interface. The latch locks the latch plate relative to the quick-release interface. A plurality of retaining arms is configured to receive and retain an article of merchandise. The retaining arms cannot be adjusted while the latch plate is locked relative to the quick-release interface. The quick-release interface has an access port providing access to the latch using a tool. The tool can be used to operate the latch into a position in which the latch disengages the latch plate, thereby releasing the latch plate from the quick-release interface.

24 Claims, 15 Drawing Sheets

Related U.S. Application Data

(60) Provisional application No. 63/050,482, filed on Jul. 10, 2020.

(51) Int. Cl.
  *F16M 11/04* (2006.01)
  *H02J 50/10* (2016.01)
  *F16M 13/02* (2006.01)

(52) U.S. Cl.
  CPC ............ *H02J 50/10* (2016.02); *F16M 13/022* (2013.01); *F16M 2200/02* (2013.01)

(58) Field of Classification Search
  CPC .... A47F 7/024; F16M 11/041; F16M 13/022; F16M 2200/02
  USPC .............. 248/551, 552, 553, 220.21, 220.22, 248/221.11, 222.13, 223.41, 225.11
  See application file for complete search history.

(56) References Cited

U.S. PATENT DOCUMENTS

| | | | | |
|---|---|---|---|---|
| 4,458,872 A * | 7/1984 | Couch | ................... | A47G 1/162 |
| | | | | 248/222.13 |
| 5,332,183 A * | 7/1994 | Kagayama | ................ | B62J 6/03 |
| | | | | 248/223.41 |
| 5,555,302 A * | 9/1996 | Wang | ................... | B60R 11/0241 |
| | | | | 379/426 |
| 5,903,645 A * | 5/1999 | Tsay | .................... | B60R 11/0241 |
| | | | | 248/316.4 |
| 6,082,688 A * | 7/2000 | Wilson | .................. | A01K 97/10 |
| | | | | 248/538 |
| 6,811,348 B1 * | 11/2004 | Meyer | ..................... | A42B 3/04 |
| | | | | 403/324 |
| 8,413,943 B1 * | 4/2013 | Li | ........................ | F16M 11/041 |
| | | | | 248/292.12 |
| 8,490,937 B2 * | 7/2013 | Crain | ................... | F16M 11/041 |
| | | | | 248/316.4 |
| 8,596,595 B2 * | 12/2013 | DeVito | ................ | F16M 11/041 |
| | | | | 211/57.1 |
| 8,711,553 B2 * | 4/2014 | Trinh | ................... | E05B 73/0082 |
| | | | | 361/679.02 |
| 8,814,128 B2 * | 8/2014 | Trinh | ..................... | F16M 13/00 |
| | | | | 340/568.2 |
| 9,097,380 B2 | 8/2015 | Wheeler | | |
| 9,194,532 B2 * | 11/2015 | Bisesti | ................... | A47F 7/024 |
| 9,353,552 B1 * | 5/2016 | Kelsch | ...................... | A47F 5/00 |
| 10,111,537 B2 | 10/2018 | Johnston et al. | | |
| 10,165,873 B2 * | 1/2019 | Gulick, Jr. | ............ | A47F 7/0246 |
| 10,322,764 B2 * | 6/2019 | Thomas | ..................... | B62J 9/21 |
| 10,378,248 B1 | 8/2019 | Kelsch et al. | | |
| 10,918,224 B2 | 2/2021 | Johnston et al. | | |
| 11,015,626 B2 * | 5/2021 | Leyden | .............. | E05B 73/0082 |
| 11,319,731 B1 * | 5/2022 | Kelsch | ................ | E05B 73/0082 |
| 11,737,582 B2 | 8/2023 | Johnston et al. | | |
| 2011/0068920 A1 | 3/2011 | Yeager et al. | | |
| 2012/0037783 A1 * | 2/2012 | Alexander | .............. | A47F 7/024 |
| | | | | 248/551 |
| 2012/0126075 A1 * | 5/2012 | Chinn | ...................... | A61G 1/04 |
| | | | | 248/221.11 |
| 2012/0192600 A1 * | 8/2012 | Johnston | ................. | A47F 7/024 |
| | | | | 70/58 |
| 2014/0346296 A1 | 11/2014 | Tschann et al. | | |
| 2015/0305518 A1 * | 10/2015 | Galant | .................. | A47F 7/0246 |
| | | | | 29/525.08 |
| 2016/0201359 A1 * | 7/2016 | Berglund | ........... | G08B 13/1472 |
| | | | | 70/58 |
| 2021/0270410 A1 * | 9/2021 | Horvath | ................ | F16M 13/02 |

OTHER PUBLICATIONS

Mobile Tech, Inc. (MTI), Freedom Axis [Product Manual].
Vanguard Protex Global, Kindle with GS Below The Counter Solution [Promotional Sheets].
Vanguard Protex Global, Tablet Quick Disconnect Bracket [Specification Sheet].

* cited by examiner

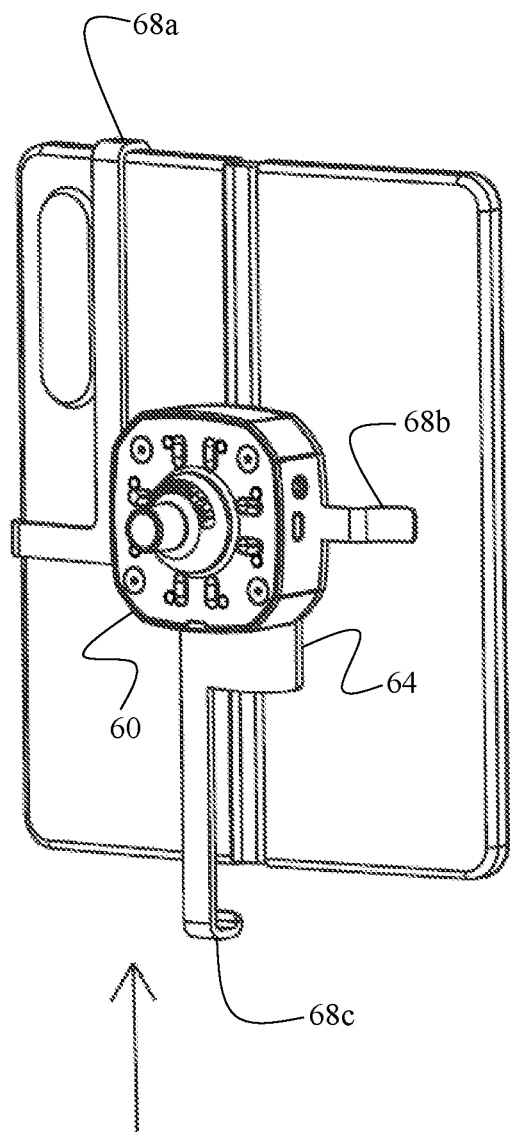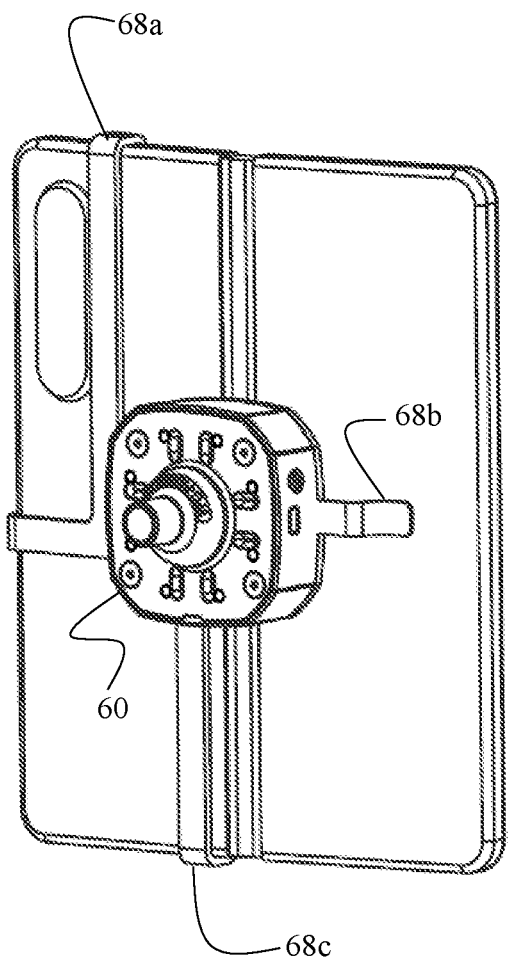
FIG. 13A                    FIG. 13B

MERCHANDISE ANTI-THEFT DEVICE WITH A QUICK-RELEASE MECHANISM

PRIORITY CLAIM

This non-provisional application is a continuation-in-part of and to U.S. non-provisional patent application Ser. No. 17/370,442 filed on Jul. 8, 2021, which claims priority to U.S. provisional application No. 63/050,482 filed on Jul. 10, 2020.

BACKGROUND OF THE INVENTION

1. Field of the Invention

This invention relates to merchandise anti-theft devices. More specifically, it relates to an anti-theft device having an interlocking assembly for securing an article of merchandise.

2. Brief Description of the Related Art

Retailers often prefer to present their merchandise to consumers in a way that allows the consumers to touch, inspect, and otherwise interact with the products at a display counter. Many merchandise items, especially portable electronic devices, are relatively expensive and, therefore, are under a serious threat of theft. Retailers often face a dilemma of balancing a need to interactively display their merchandise to attract customers and increase sales, with a need to safeguard the merchandise against theft.

One type of anti-theft device for securing articles of merchandise involves a bracket having retention arms that secure an article of merchandise by grasping the opposite edges thereof. An example of such device is disclosed in U.S. Pat. No. 10,378,268, entitled "Anti-Theft Device with Adjustable Locking Arms for Securing an Article of Merchandise." In this type of a security device, the bracket is positioned behind the article of merchandise, thus enabling customers to have full, unobstructed access to the front face—i.e., the screen—of the article of merchandise. However, to safeguard the article of merchandise against unauthorized removal from the retail store, the bracket must be securely connected to a display counter.

In certain circumstances, the retail stores have a need to quickly disconnect the bracket portion of the anti-theft device from the display counter, so that the bracket—and the article of merchandise secured therein—can be easily released and handed to the customer for a closer hands-on interaction or can be securely stored away in a safe when the retail store is closed, such as at night. It is also desirable that the bracket can be quickly and efficiently reconnected by locking it to an interface of the security device anchored to the retail display counter.

Thus, what is needed is an anti-theft device that enables store personnel to quickly and efficiently disconnect and, subsequently, reconnect a bracket of the anti-theft device retaining the article of merchandise to the interface of the anti-theft device anchored to the retail display counter.

SUMMARY OF THE INVENTION

The need for a retail security device having a quick connect and disconnect functionality is now met by a novel and non-obvious invention. In an embodiment, the invention pertains to an anti-theft device that uses a securing bracket having adjustable lockable arms to retain the merchandise therein. A latch plate attaches to the underside of the securing bracket. The latch plate has one or more rails disposed on the bottom surface thereof. The anti-theft device further includes a quick-release interface configured to couple to the latch plate, wherein the quick-release interface is anchored to a display counter. In an embodiment, the quick-release interface can be secured to the display counter using a mechanical tether—for example, a steel cable.

In an embodiment, the securing bracket may have static- rather than adjustable retaining arms and may be coupled directly to the quick-release interface. In this embodiment, the latch plate also comprises a static retaining arm that is configured to cooperate with the retaining arms of the securing bracket to secure the article of merchandise therein. The latch plate is configured to be locked to the quick-release interface, such that the retaining arms of the latch plate and the securing bracket cannot be adjusted. To release the article of merchandise from the retaining arms, the latch plate must be unlocked from the quick-release interface.

In an embodiment, the quick-release interface has one or more longitudinal channels. Each longitudinal channel is configured to receive a corresponding rail of the latch plate. A torsion latch is rotationally disposed within the quick-release interface. The latch has a first position in which the latch is configured to engage the rail of the latch plate, and a second position in which the latch disengages the rail. When the latch is in its first position, the latch immobilizes the rail against movement within the longitudinal channel. In this manner, the latch plate remains securely coupled to the quick-release interface. In the second position, the latch disengages the rail of the latch plate, thereby enabling the rail to slide within the longitudinal channel of the quick-release interface. Thus, when the latch is in the second position, the rail can exit the longitudinal channel, thereby releasing the latch plate from the quick-release interface.

A tool is required to operate the latch to transition it into its second position. The quick-release interface has an access port providing access to the latch, so that the appropriate tool can be inserted via the access port. The tool can then be used to transition the latch into the second position, thereby disengaging the latch from the rail and releasing the latch plate from the quick-release interface.

In an embodiment, the longitudinal channel has an opening on a surface of the quick-release interface, wherein the rail of the latch plate is configured to enter and exit the longitudinal channel via the opening. The rail is restricted from exiting the longitudinal channel when the rail is not aligned with the opening. In an embodiment, the rail has a lip, and the longitudinal channel has a flange. The lip of the rail is configured to slide underneath the flange of the longitudinal channel when the latch plate is coupled to the quick-release interface. In this manner, the flange restricts the rail against exiting the longitudinal channel.

In an embodiment, the rail has a notch configured to receive the latch. When the latch resides within the notch, the latch immobilizes the rail within the longitudinal channel. To couple the latch plate to the quick-release interface, the rail of the latch plate is inserted into the longitudinal channel and is translated therealong. The rail engages the latch and transitions the latch into the second position. When the latch becomes aligned with the notch, the latch returns to the first position and enters the notch, thereby immobilizing the rail within the longitudinal channel.

In an embodiment, the security device includes a pedestal mounted to the display counter. The quick-release interface is configured to removably rest on the pedestal. The pedestal and the quick-release interface may be equipped with complementary electrical contacts, such that electrical power can be transferred from the pedestal to the quick-release interface when the quick-release interface is at rest on the pedestal. Furthermore, a wireless charging pad may be connected to the latch plate, while a wireless charging control module can be electrically coupled to the quick release interface. The wireless charging pad and the wireless charging control module have complementary electrical contacts, configured to establish an electrical connection with one another when the latch plate is coupled to the quick-release interface. In this manner, the wireless charging pad can wirelessly supply electrical power to the article of merchandise. Alternatively, instead of a wireless control module, the quick-release interface may simply have electrical contacts coupled thereto to enable power transfer between the quick-release interface and the charging pad. In this embodiment, the wireless control module may be integrated into the charging pad itself rather than connected to a quick-release interface.

In an embodiment, a tether is connected to the quick-release interface. The tether passes through apertures within the pedestal and the display counter, and an anchor is attached to the tether underneath the display counter.

DESCRIPTION OF THE DRAWINGS

For a fuller understanding of the invention, reference should be made to the following detailed description, taken in connection with the accompanying drawings, in which:

FIG. 13A is a perspective back view of the embodiment of the invention configured to secure a vertically folding article of merchandise, depicting the latch plate in an open position.

FIG. 13B is a perspective back view of the embodiment of the invention configured to secure a vertically folding article of merchandise, depicting the latch plate in a locked position.

DETAILED DESCRIPTION OF THE PREFERRED EMBODIMENT

In the following detailed description of the preferred embodiment, reference is made to the accompanying drawings, which form a part hereof, and within which specific embodiments are shown by way of illustration by which the invention may be practiced. It is to be understood that other embodiments may be utilized and structural changes may be made without departing from the scope of the invention.

Figure 1:
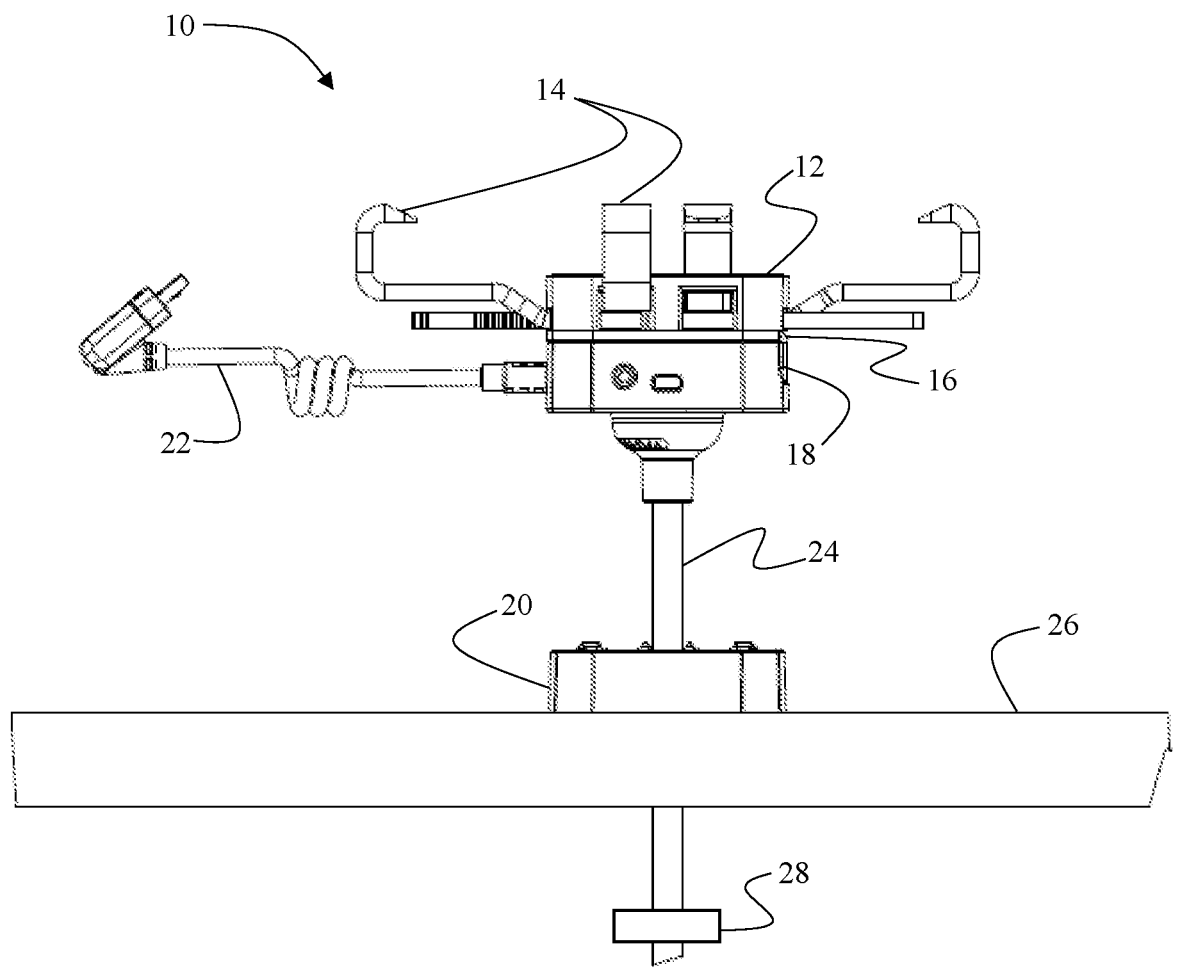
FIG. 1 is a side view depicting the anti-theft device.

FIG. 1 depicts a side view of security device 10. Security device 10 comprises a securing bracket 12 having a plurality of adjustable retaining arms 14 configured to receive and secure an article of merchandise. To secure merchandise—such as a smartphone—the merchandise is placed into bracket 12, and retention arms 14 are partially retracted into the housing of bracket 12 so that the C-shaped grips disposed on the terminal ends of arms 14 grasp edges/corners of the merchandise. After the merchandise is secured within bracket 12, a locking mechanism is engaged to immobilize retaining arms 14. An embodiment of securing bracket 12 is disclosed in more detail in U.S. Pat. No. 10,378,268.

Figure 3A:
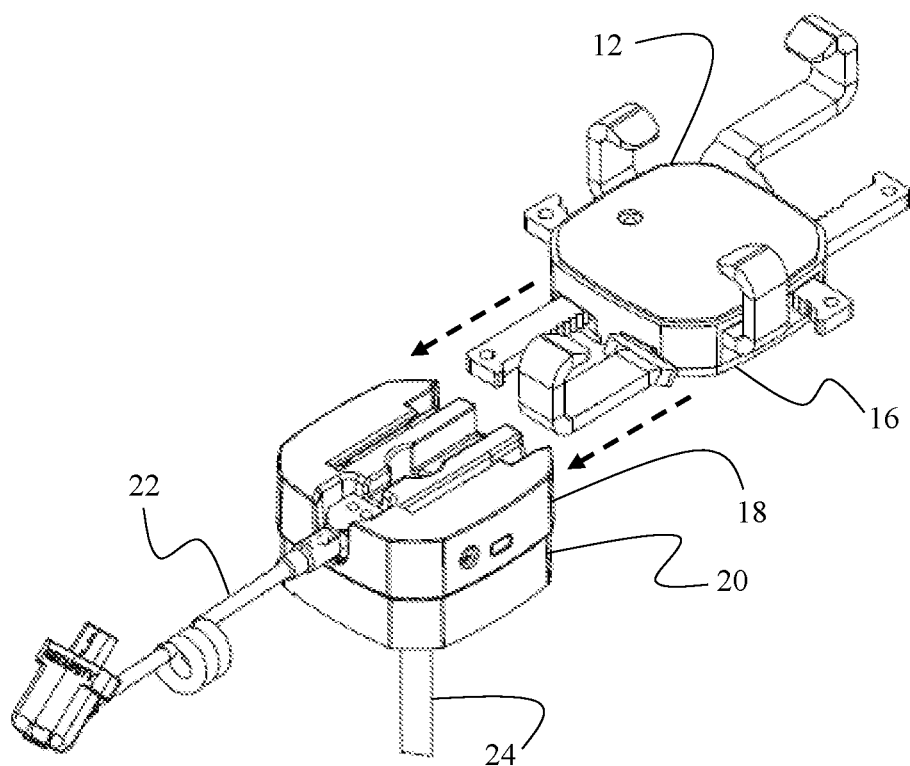
FIG. 3A is a perspective top view depicting the interaction between the quick-release interface and the latch plate, with the power cable coupled to a power port of the quick-release interface.
Figure 3B:
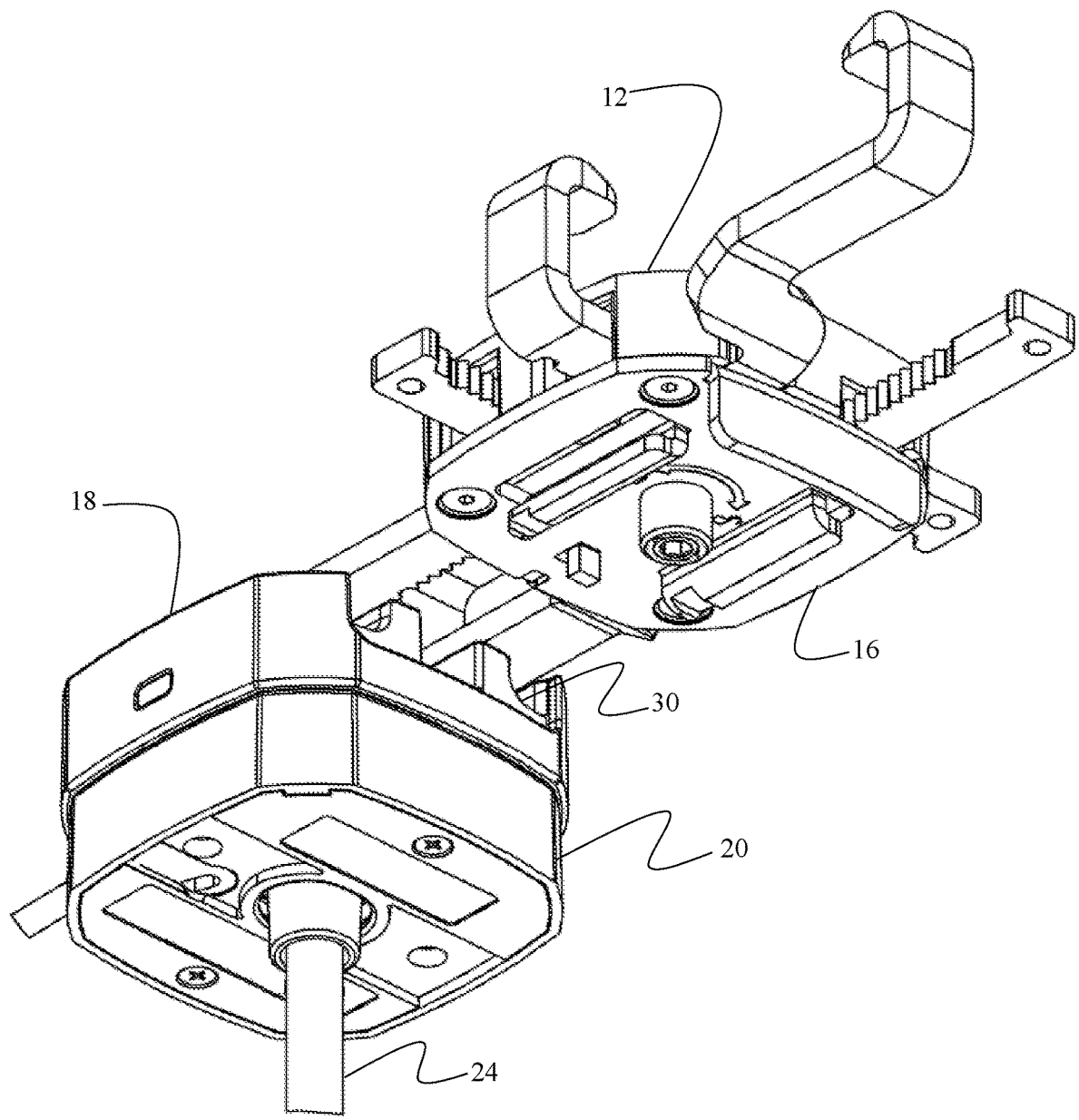
FIG. 3B is a perspective bottom view depicting the interaction between the quick-release interface and the latch plate.

FIG. 1 further depicts a latch plate 16 attached to the underside of securing bracket 12. FIG. 1 further depicts a quick-release interface 18 coupled to latch plate 16. In this manner, latch plate 16 is sandwiched between securing bracket 12 and quick-release interface 18. Latch plate 16 and quick-release interface 18 are depicted in more detail in FIGS. 4 and 5, respectively. The manner in which latch plate 16 is configured to couple to quick-release interface 18 is depicted in FIGS. 3A-3B.

Continuing reference to FIG. 1, a pedestal 20 is mounted onto a display counter 26. The top surface of pedestal 20 is configured to mate with the underside surface of quick-release interface 18. In this manner, quick-release interface 18 is configured to removably rest on pedestal 20.

In an embodiment, pedestal 20 has a plurality of electrical contacts, which are electrically connected to a power supply. The underside of quick-release interface 18 also has electrical contacts. When quick release interface 18 is at rest on pedestal 20, the electrical contacts of quick-release interface 18 engage the electrical contracts of pedestal 20, thereby enabling electrical power to be delivered from pedestal 20 to quick-release interface 18. Quick-release interface 18 may further comprise a power cable 22. A terminal end of power cable 22 has a connector configured to couple to a power port of the merchandise. In this manner, when quick-release interface 18 is at rest on pedestal 20, electrical power can be delivered from pedestal 20 to the merchandise secured within bracket 12. In this manner, a battery of the merchandise can be recharged when quick-release interface 18 is at rest on pedestal 20.

Figure 7A:
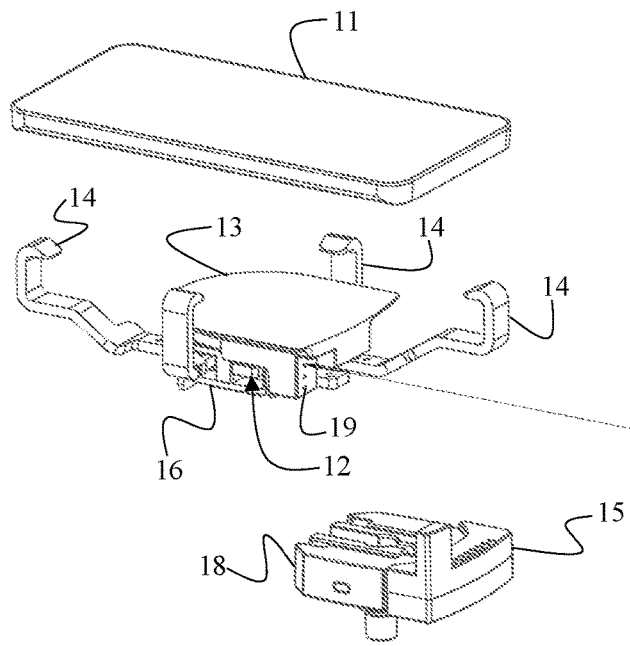
FIG. 7A is a perspective front-right view depicting an embodiment of the anti-theft device configured to wirelessly charge the article of merchandise.
Figure 7B:
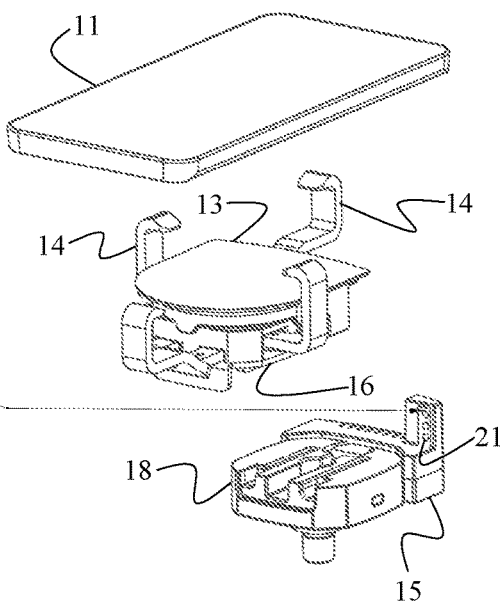
FIG. 7B is a perspective front-left view depicting the embodiment of the anti-theft device configured to wirelessly charge the article of merchandise.
Figure 8A:
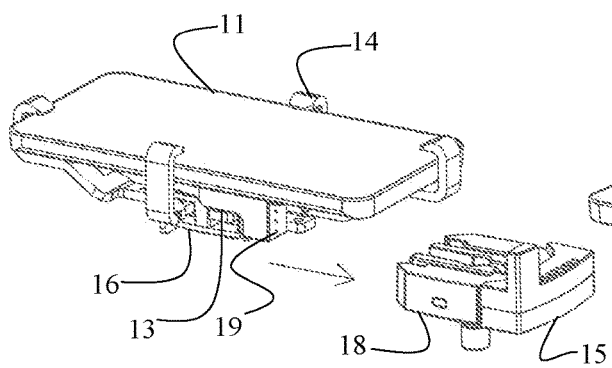
FIG. 8A is a perspective front-right view depicting the process of coupling the latch plate and the quick-release interface for the embodiment of the anti-theft device configured to wirelessly charge the article of merchandise.

FIGS. 7 and 8 depict that security device 10 can be configured to wirelessly charge article of merchandise 11. To achieve this functionality, a charging pad 13 is connected to securing bracket 12. Charging pad 13 houses an inductive coil configured to interact with an inductive coil of article of merchandise 11. Inductive coils are disclosed as an example of a wireless power transfer means, and other types of wireless power transfer devices (for example, Near Field Communication (NFC) antennas) fall within the scope of the invention. When article of merchandise 11 is secured within retaining arms 14 of securing bracket 12, charging pad 13 abuts the rear surface of article of merchandise 11, enabling the inductive coil of charging pad 13 to wirelessly supply electrical power to the inductive coil of article of merchandise 11. In this manner, charging pad 13 is configured to provide wireless charging capability to anti-theft device 10.

Figure 8B:
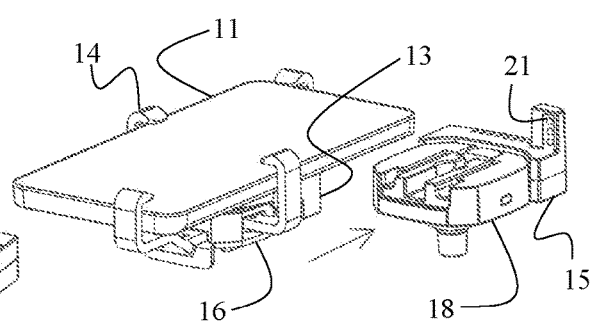
FIG. 8B is a perspective front-left view depicting the process of coupling the latch plate and the quick-release interface for the embodiment of the anti-theft device configured to wirelessly charge the article of merchandise.

FIGS. 7 and 8 further depict a wireless charging module 15 electrically coupled to quick-release interface 18. In this embodiment, wireless charging module 15—rather than power cable 22 (depicted in FIG. 2)—is electrically coupled to power port 17. FIGS. 7B and 8B depict that wireless charging module 15 has electrical contacts 21 that are configured to mate with complementary electrical contacts 19 of charging pad 13. In this manner, electrical power can be delivered from quick-release interface 18 to charging pad 13 via engagement between electrical contacts 19 and 21, thereby enabling the inductive coil of charging pad 13 wirelessly supply electrical power to article of merchandise 11. Accordingly, when quick-release interface 18 is resting on pedestal 20 and is electrically connected thereto, electrical power from pedestal 20 is delivered to charging pad 13, enabling charging pad 13 to wirelessly charge the battery of merchandise 11.

Therefore, based on the disclosure provided above, security device 10 can be efficiently adapted for either wired or wireless charging by selectively coupling either power cable 22 or wireless charging module 15 to power port 17. This feature enables security device 10 to provide universal charging capability to article of merchandise 11, irrespective of whether artless of merchandise 11 is configured for wired or wireless charging.

Reverting to FIG. 1, security device 10 may further include a tether 24, which secures quick-release interface 18 against unauthorized removal from a display counter 26. Tether 24 has a first end connected to quick-release interface 18 and a second end residing underneath a display counter 26. In this embodiment, pedestal 20 and display counter 26 have aligned apertures through which tether 24 passes. An anchor 28 is affixed to the second end of tether 24, underneath display counter 26. Anchor 28 is larger than the aperture within display counter 26, and therefore, anchor 28 prevents tether 24 from being fully withdrawn through the aperture. In this manner, tether 24 connects and secures quick-release interface 18 to display counter 20. Tether 24 can be flexible (e.g., a cable) or rigid (e.g., a rod). Alternatively, instead of using a fixed-length tether 24 with anchor 28, tether 24 can be a retractable cable wrapped on a spinning reel.

Because securing bracket 12 is coupled to quick-release interface 18 via latch plate 16, the length of tether 24 dictates the maximum distance by which merchandise can be lifted from pedestal 20. Accordingly, a customer can lift the merchandise off pedestal 20 for a closer interaction but cannot steal the merchandise because the merchandise is secured to display counter 26 by tether 24. In an embodiment, tether 24 can be made of a strong metal or a metal alloy, for example, steel. In an alternative embodiment, quick release interface 18 can be mounted directly to pedestal 20 or display counter 26, foregoing tether 24. In such embodiment, merchandise is displayed stationarily and cannot be lifted for a closer interaction.

Figure 2:
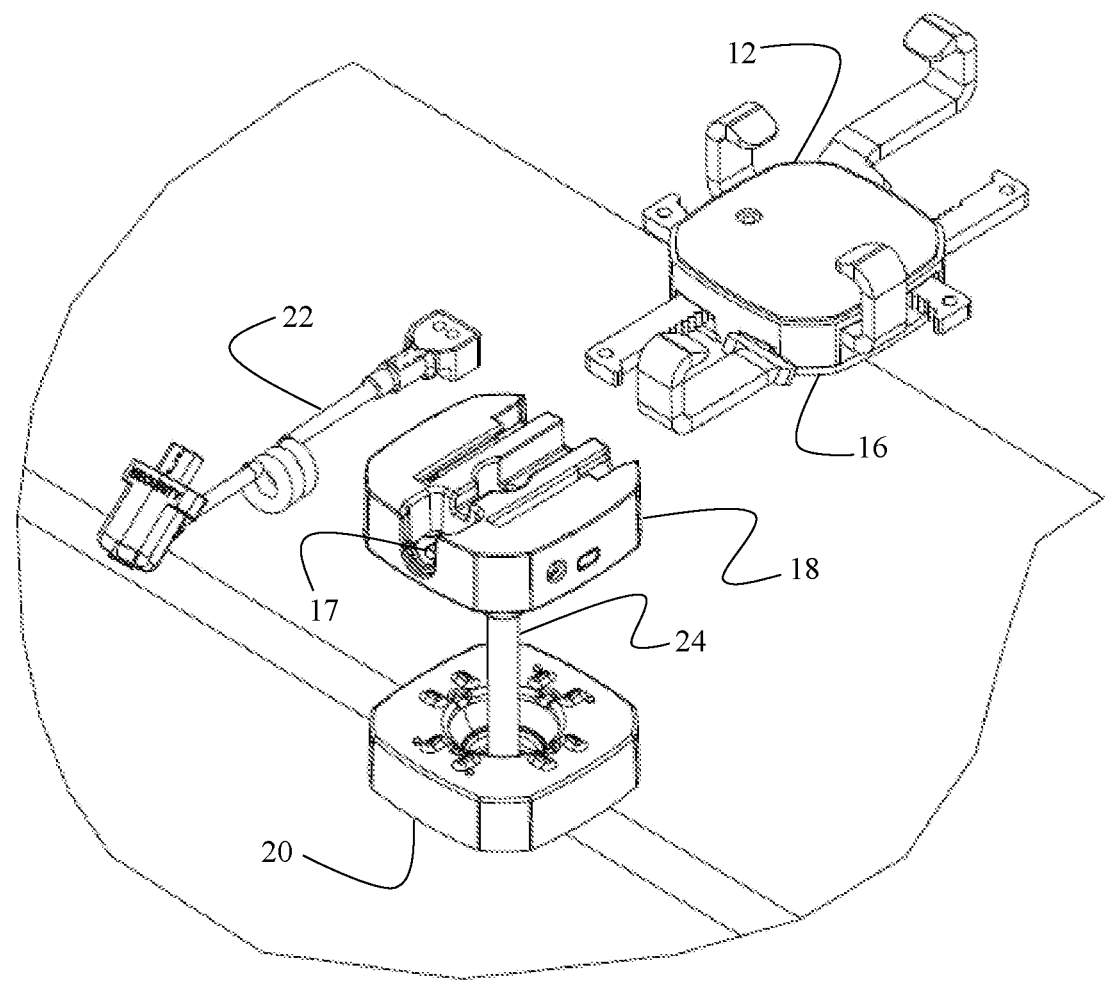
FIG. 2 is a perspective view of the anti-theft device in a decoupled configuration, with a power cable detached.

FIG. 2 depicts security device 10, with latch plate 16 decoupled from quick-release interface 18. FIG. 2 depicts that, when latch plate 16 is decoupled from quick-release interface 18, power cable 22 can be disconnected from quick-release interface 18. This feature enables store personnel to interchange power cables 22 having various connectors to accommodate the power port of merchandise being secured. Quick-release interface 18 has a recess configured to receive power cable 22. When latch plate 16 is coupled to quick-release interface 18, latch plate 16 covers the recess, thereby preventing power cable 22 from being disconnected from the quick-release interface 18 without first decoupling latch plate 16 from quick-release interface 18.

FIGS. 3A and 3B depict that securing bracket 12 is configured to couple to quick-release interface 18 by sliding rails 38 of latch plate 16 into channels 30 disposed within quick-release interface 18. As will described in more detail below, with reference to FIGS. 4-6, latch plate 16 and quick-release interface 18 have structural features that enable them to quickly and securely mate with one another. A locking mechanism is disposed within quick-release interface 18. In the coupled configuration, the locking mechanism is configured to immobilize latch plate 16 relative to quick-release interface 18. Because quick-release interface 18 is anchored to display counter 26 with tether 24, latch plate 16 and bracket 12 are secured against unauthorized removal from display counter 26. As was explained above, tether 24 allows bracket 12 (and the merchandise secured therein) to be lifted from pedestal 20 by a distance dictated by the length of tether 24. To release bracket 12 from the restraint of tether 24, latch plate 16 must be disconnected from quick-release interface 18.

Figure 4:
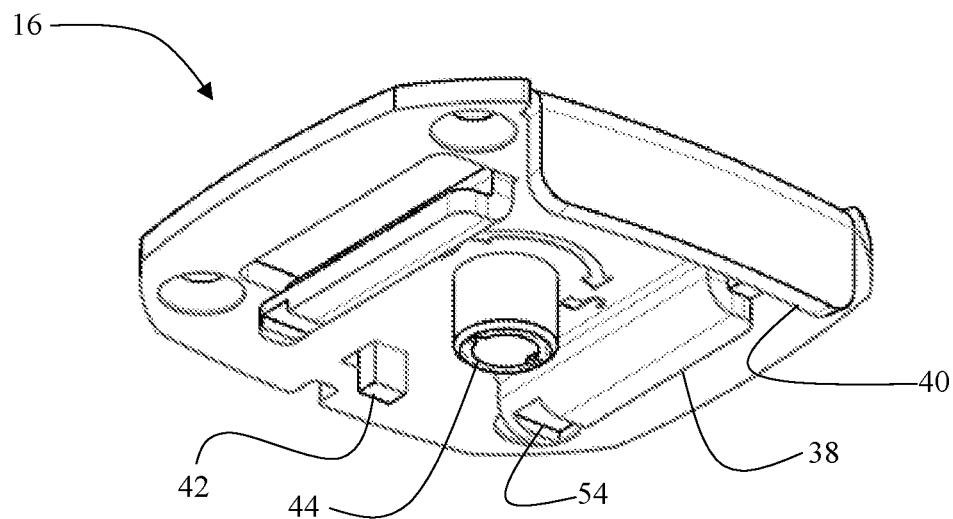
FIG. 4 is a perspective bottom view depicting the latch plate.
Figure 5:
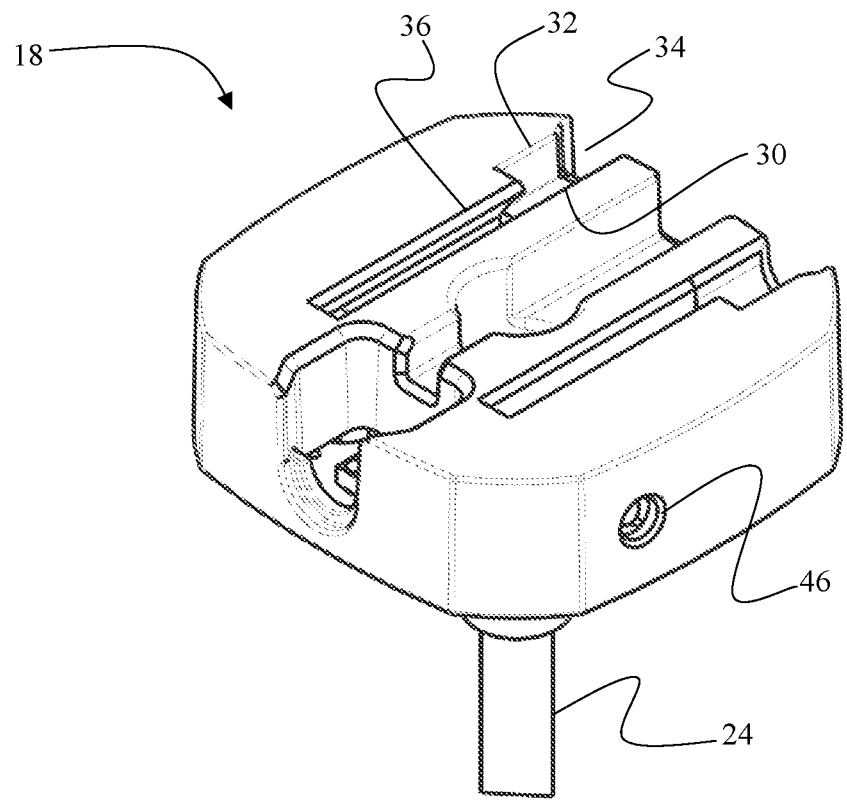
FIG. 5 is a perspective view of the quick-release interface.
Figure 6:
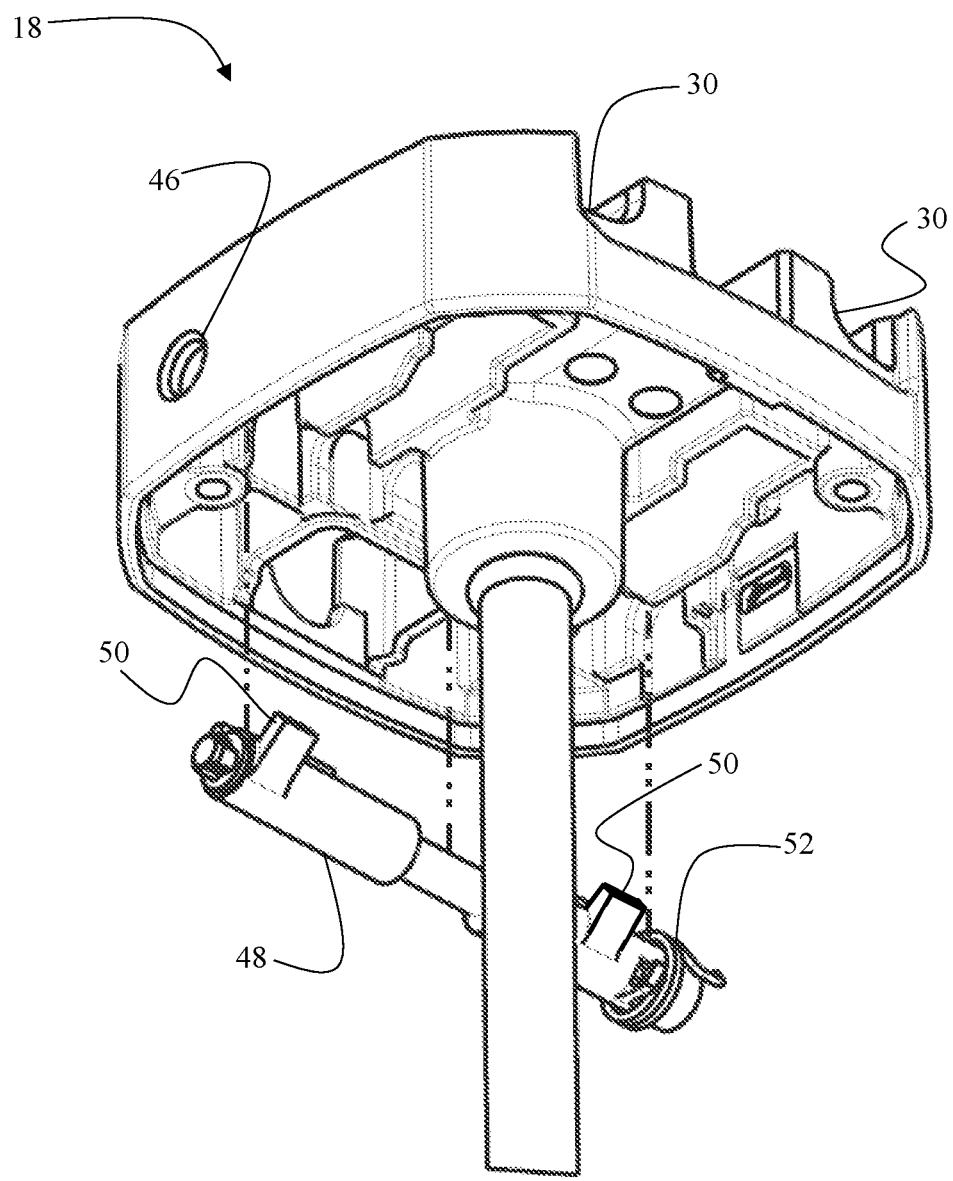
FIG. 6 is an exploded view of the quick-release interface depicting the torsion latch.

FIGS. 4-6 depict the structural features of quick-release interface 18 and latch plate 16 that enable them to interlock with one another. Specifically, FIG. 5 depicts that quick-release interface 18 has two longitudinal channels 30. Each channel 30 has a top opening 32 on the top surface of quick-release interface 18 and a lateral opening 34 on the lateral side of quick-release interface 18. Each channel 30 also has a flange 36 partially occluding top opening 32 of the channel at the top surface of quick-release interface 18.

FIG. 4 depicts latch plate 16 having two elongated rails 38. Rails 38 are configured to enter channels 30 through lateral openings 34. FIG. 4 further depicts that each rail 38 has a lip. When rails 38 are positioned within channels 30, flanges 36 engage the lips of rails 38, thereby preventing rails 38 from exiting channels 30 via top openings 32. In this manner, flanges 36 immobilize latch plate 16 against being lifted off quick-release interface 18. Thus, the only way to detach latch plate 16 from quick-release interface 18 is by sliding latch plate 16 relative to quick-release interface 18 so that rails 38 can exit channels 30 via lateral openings 34.

FIG. 4 further depicts that, latch plate 16 may have a front cover 40 configured to occlude lateral openings 34 of channels 30 when latch plate 16 is coupled to quick-release interface 18. In this manner, front cover 40 ensures that channels 30 cannot be accessed when latch plate 16 is coupled to quick interface 18. FIG. 4 also depicts that latch plate 16 may include a protrusion 42 configured to immobilize power cable 22 against removal from the recess of quick-release interface 18.

Finally, FIG. 4 depicts that latch cover 16 has a port 44 providing access to the locking mechanism of securing bracket 12. When latch plate 16 is coupled to quick-release interface 18, port 44 is concealed, and, therefore, securing bracket 12 cannot be unlocked. To access the locking mechanism of securing bracket 12, latch plate 16 must be decoupled from quick-release interface 18.

FIG. 5 depicts that quick-release interface 16 has an access port 46. As depicted in FIG. 6, access port 46 provides access to a torsion latch 48 rotationally disposed within quick-release interface 18. Torsion latch 48 has one or more teeth 50. Torsion latch 48 has a first position in which teeth 50 protrude into channels 30 of quick-release interface 18. Torsion latch 48 can be rotated about its central axis into a second position, in which teeth 50 are retracted away from channels 30.

Torsion latch 48 is structured such that the angular range of its rotation is restricted so that torsion latch 48 can only rotate between the first and second positions. Quick-release interface 18 further comprises a torsion spring 52 configured to bias torsion latch 48 toward the first position in which teeth 50 protrude into the channels 30.

FIG. 5 depicts that rails 38 of latch plate 16 have notches 54. Notches 54 are configured to receive teeth 50 of torsion latch 48 when torsion latch 48 is in its first position. When teeth 50 enter notches 54, they immobilize rails 38 against longitudinal movement within channels 30. Accordingly, when torsion latch 48 is in its first position and latch plate 16 is coupled to quick-release interface 18, torsion latch 48 immobilizes latch plate 16 relative to quick-release interface 18.

Latch plate 16 is configured to be locked to quick-release interface 18 in the manner depicted in FIGS. 3A-3B. First, latch plate 16 is positioned at the lateral side of quick-release interface 18 so that rails 38 align with lateral openings 34 of channels 30. Next, the user slides latch plate 16 laterally relative to quick-release interface 18, such that the rails 38 of latch plate 16 slide into channels 30 of quick-release interface 18. As rails 38 continue to slide within channels 30, proximal ends of rails 38 engage teeth 50 of torsion latch 48 causing torsion latch 48 to rotate in the counterclockwise direction, against the biasing force of torsion spring 52. In this manner, torsion latch 48 rotates into its second position in which teeth 50 are retracted away from channels 30, thereby permitting rails 38 to slide past torsion latch 48.

When rails 38 are fully inserted into channels 30, notches 54 become aligned with teeth 50. At this point, the biasing force of torsion spring 52 causes torsion latch 48 to rotate in the clockwise direction, back into its first position. In this first position, teeth 50 of the torsion latch 48 enter notches 52 of rails 38, immobilizing rails 38 against longitudinal movement within channels 30. In this manner, latch plate 16 is securely coupled to quick-release interface 18.

To release latch plate 16 from quick-release interface 18, torsion latch 48 must be rotated into its second position, in which teeth 50 exit notches 54. This can be accomplished by rotating torsion latch 48 in the counterclockwise direction, against the biasing force of torsion spring 52. To accomplish this, a specific tool (not shown) may be inserted into access port 46 of quick-release interface 18. The tool can be configured to engage torsion latch 48 and rotate it into the second position. When torsion latch 48 is rotated into its second position, teeth 50 exit notches 54, thereby releasing latch plate 16. Thus, to release latch plate 16 from quick-release interface 18, the tool must be used to rotate torsion latch 48 into its second position. While using the tool to maintain torsion latch 48 in its second position, the user applies a force onto latch plate 16 to slide latch plate 16 relative to quick-release interface 18 in the direction of channels 30. At this point, rails 38 can exit channels 30 via their lateral openings 34, thus releasing latch plate 16 from quick-release interface 18.

It shall be noted that the direction of rotation in the embodiment described above is merely exemplary. It will be appreciated that latch plate 16 and quick-release interface 18 can be structured so that torsion latch 48 rotates in counterclockwise direction when tooth 50 is displaced by rails 38 and, then, springs back in the clockwise direction when notches 54 are positioned over teeth 50. Such structural differences are merely a design choice and fall within the scope of the subject matter of the invention.

As should be evident from the description provided above, when latch plate 16 is coupled to quick-release interface 18, security device 10 provides multiple layers of security. First, port 44 through the which the locking mechanism of securing bracket 12 can be accessed is concealed. Thus, the merchandise cannot be released from retaining arms 14 while securing bracket 12 is coupled to quick-release interface 18 via latch plate 16. Second, tether 24 anchors quick-release interface 18 to display counter 26 and, therefore, prevents removal of merchandise from display counter 26. Third, only a specific tool (key) can be used to disengage torsion latch 48 from rails 38. Thus, without being in possession of this specific tool, a thief would not be able to decouple latch plate 16 from quick-release interface 18. Fourth, power cable 22 cannot be removed from quick-release interface 18 while quick-release interface 18 and latch plate 16 are coupled together.

Figure 9:
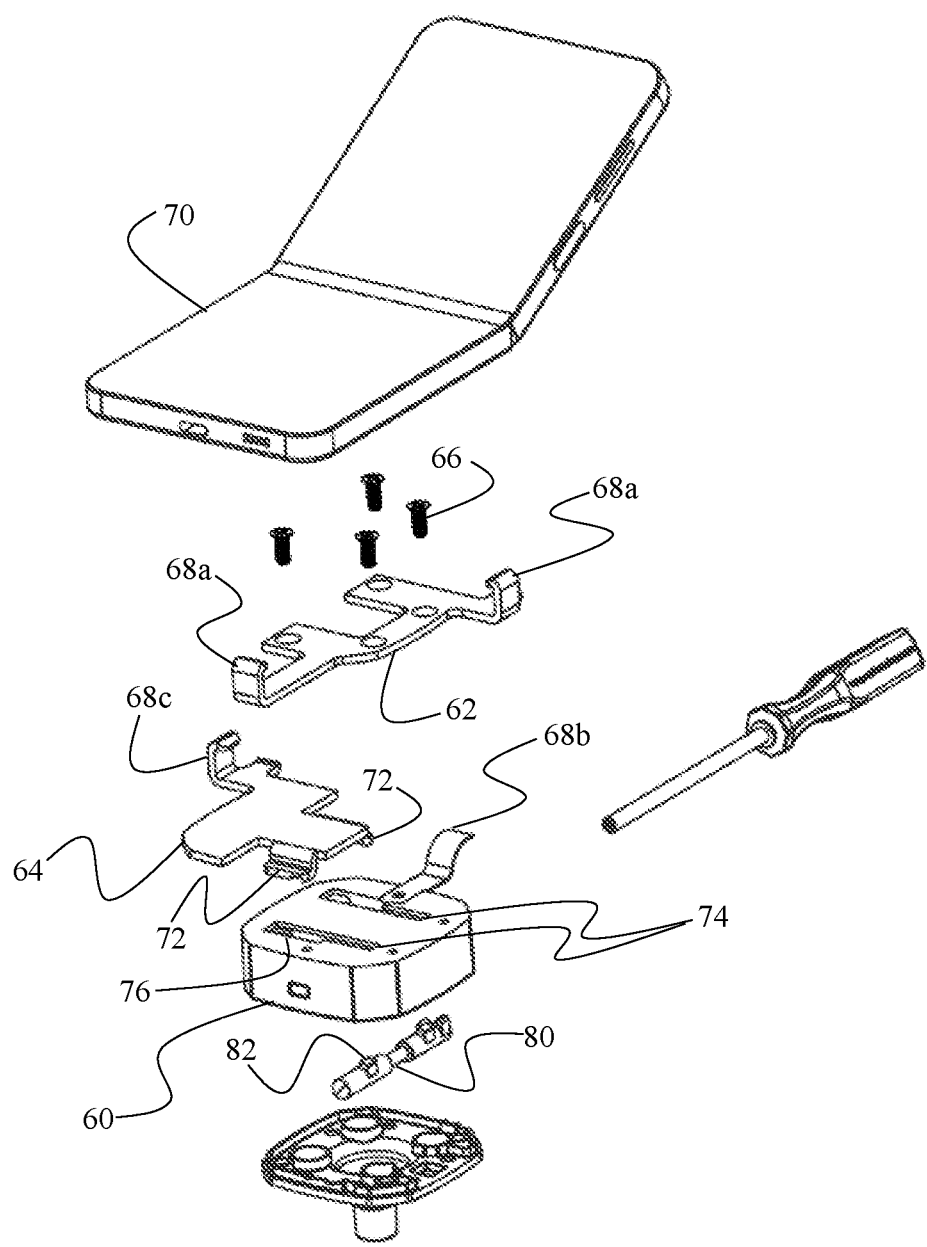
FIG. 9 is an exploded view of an embodiment of the invention configured to secure a horizontally folding article of merchandise.

FIG. 9 depicts an exploded view of another embodiment of the invention. This embodiment utilizes a quick-release interface 60, securing bracket 62, and latch plate 64. In this embodiment, securing bracket 62 is configured to be attached directly to quick-release interface 60 using fasteners 66 or another type of coupling means. Securing bracket 62 has one or more retaining arms 68a configured to receive lateral sides of article of merchandise 70. Retaining arms 68a can be static, rather than adjustable. This embodiment is especially adapted for securing article of merchandise 70 that are configured to fold, slide, roll or otherwise alter its shape.

FIG. 9 further depicts that one or more additional retaining arm 68b can be attached directly to quick-release interface 60. In this manner, article of merchandise 70 can be coupled to quick-release interface 60 via retaining arms 68a of securing bracket 62 and, if needed, additional retaining arms 68b attached directly to quick-release interface 60. FIG. 9 depicts that retaining arm 68b may be shaped differently than retaining arms 68a because retaining arm 68b is configured to secure a hinged side of article of merchandise 70 and, therefore, is shaped and structured to permit article of merchandise 70 to fold and unfold about its hinged edge.

FIG. 9 depicts that latch plate 64 has a retaining arm 68c integrated therein. On the underside, latch plate 64 comprises rails 72. FIG. 9 further depicts that quick-release interface 60 has two longitudinal channels 74. Each channel 74 has an opening 76 on the top surface of quick-release interface 74 and/or an opening on the lateral side of quick-release interface 74 (as depicted in FIGS. 4-6). Each channel 74 also has a flange partially restricting the opening of channel 74.

A torsion latch 80 is rotationally disposed within quick-release interface 60. Torsion latch 80 can be rotated about its center axis between a first position, in which teeth 82 protrude into channels 74, and a second position, in which teeth 82 are retracted away from channels 74. A torsion spring can be used to bias torsion latch 80 toward the first position in which teeth 82 protrude into the channels 74.

Figure 10A:
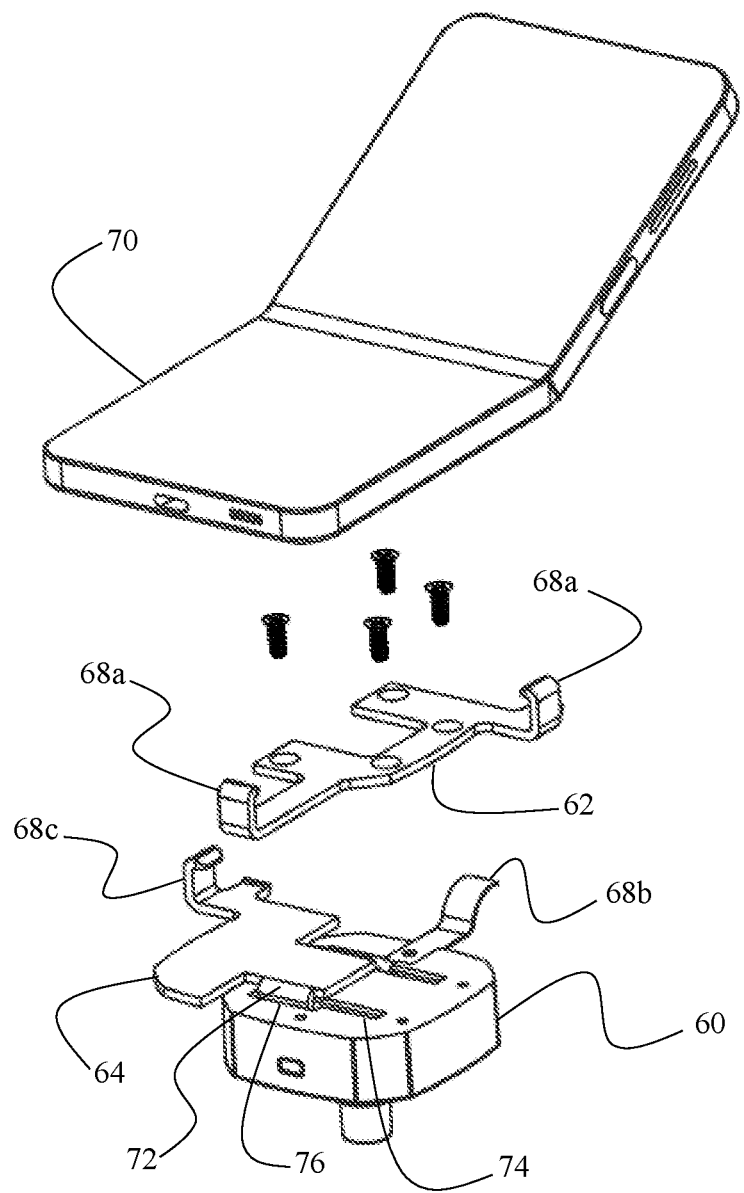
FIG. 10A is a perspective front view of the embodiment of the invention configured to secure a horizontally folding article of merchandise, depicting the rails of the latch plate inserted into opening of longitudinal channels of the quick-release interface.
Figure 10B:
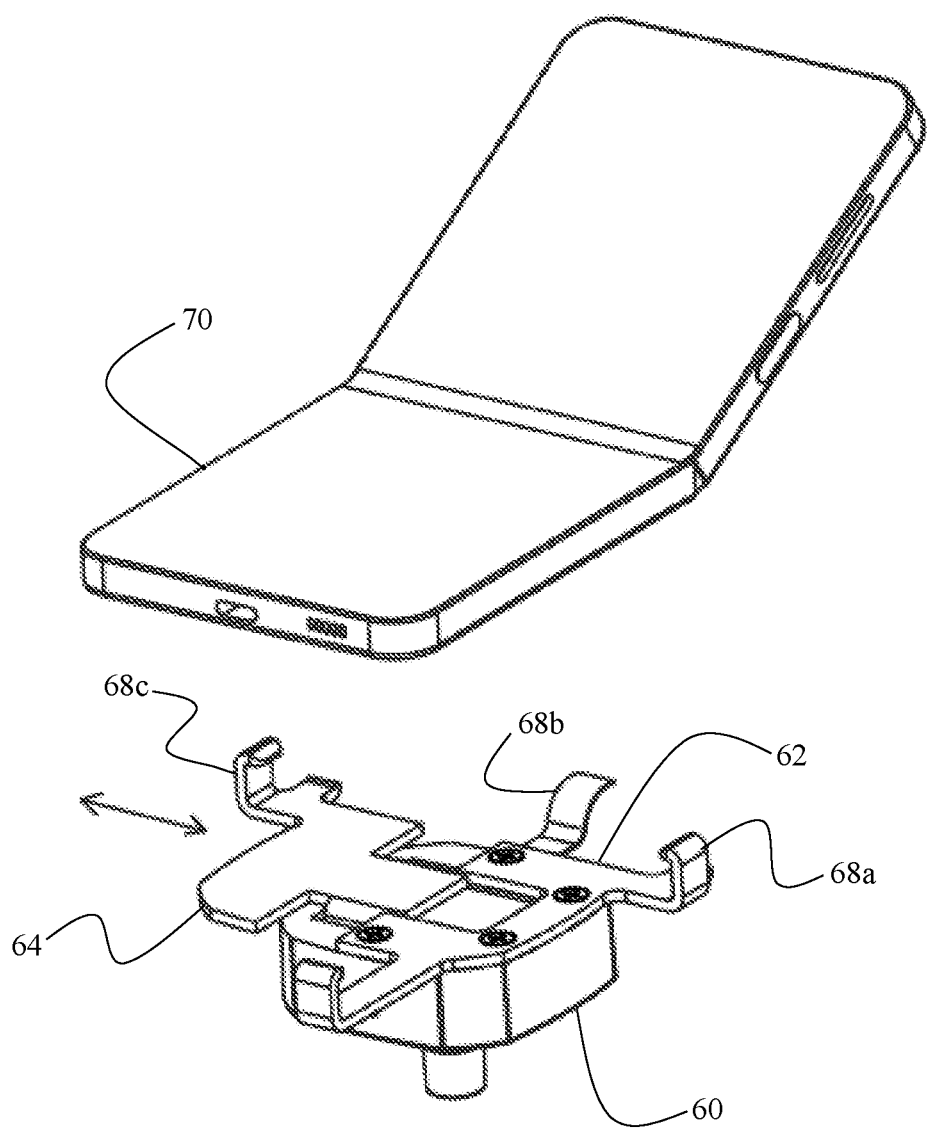
FIG. 10B is a perspective front view of the embodiment of the invention configured to secure a horizontally folding article of merchandise, depicting the securing bracket affixed to the quick-release interface and the latch plate slidingly disposed within the longitudinal channels of the quick-release interface.

FIGS. 10A and 10B depicts that latch plate 64 is configured to interconnect with quick-release interface 60 by inserting rails 72 into openings 76 of channels 74. At this point, the distance between retaining arm 68c of latch plate 64 and opposite retaining arm 68a of securing bracket 62 is greater than the width of article of merchandise 70.

Figures 11A, 11B:
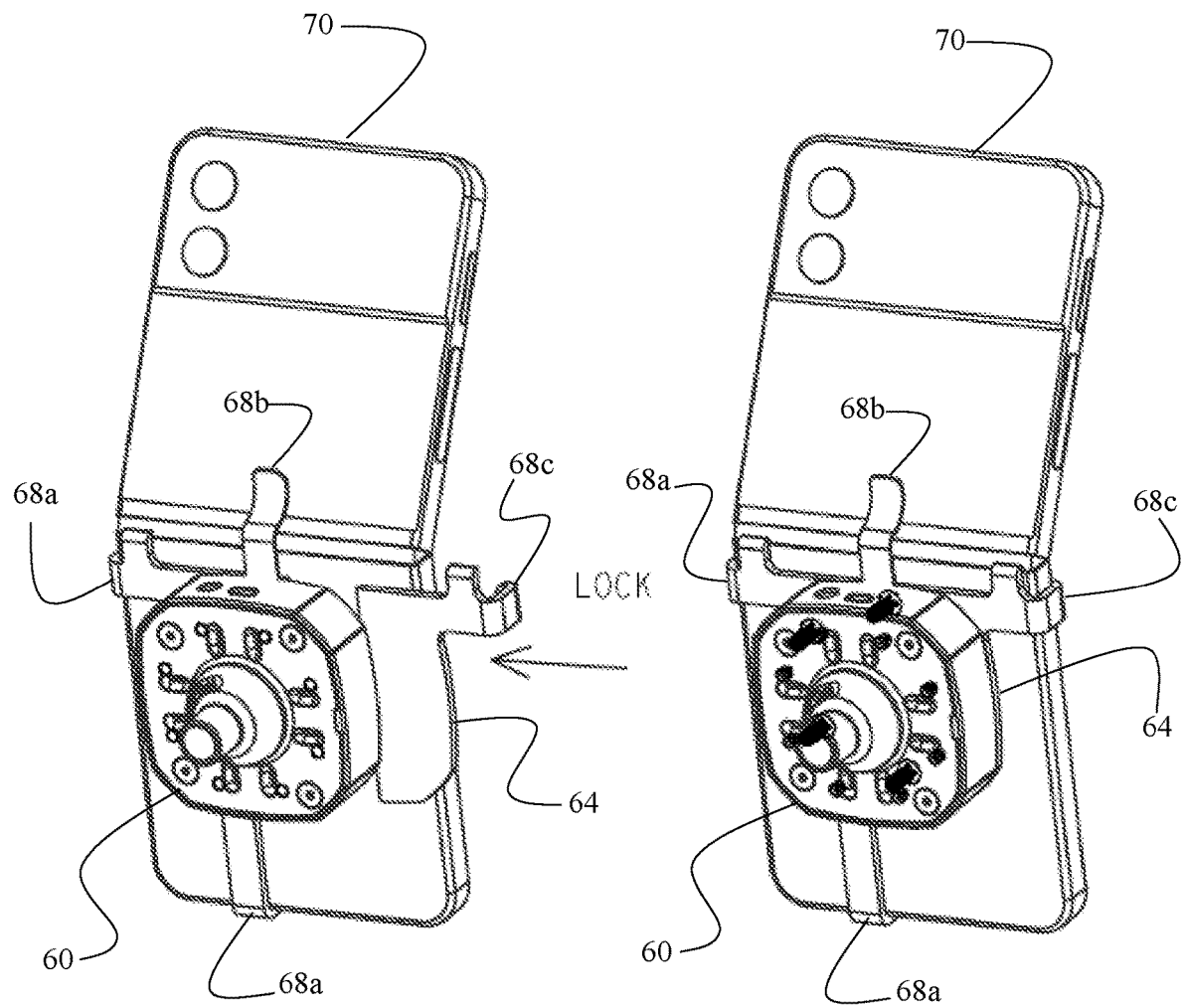
FIG. 11A is a perspective back view of the embodiment of the invention configured to secure a horizontally folding article of merchandise, depicting the latch plate in an open position.
FIG. 11B is a perspective back view of the embodiment of the invention configured to secure a horizontally folding article of merchandise, depicting the latch plate in a locked position.

To secure article of merchandise 70, it is positioned on top of securing bracket 62 and latch plate 64, as depicted in FIG. 11A. Next, a force is applied onto latch plate 64, causing rails 72 to slide within channels 74. In this manner, latch plate 64 is configured to slide relative to quick-release interface 60, until retaining arms 68a and 68c simultaneously capture the lateral side of article of merchandise 70, as depicted in FIG. 11B.

As disclosed above with reference to FIG. 9, quick-release interface 60 has a locking mechanism, which comprises a torsion latch 80 having one or more teeth 82. When rails 72 of latch plate 64 slide within channels 74, they apply a force onto teeth 82 causing torsion latch 80 to rotate into its second position. As rails 72 continue to slide within channels 74, notches disposed on rails 72 become aligned with teeth 82. At this point, the biasing force of the spring causes torsion latch 80 to rotate into its first position, in which teeth 82 enter into the notches of rails 72, thereby immobilizing rails 72 against longitudinal movement within channels 74. In this manner, when torsion latch 80 is in its first position and latch plate 64 is coupled to quick-release interface 60, torsion latch 80 immobilizes latch plate 64 relative to quick-release interface 60. In this locked position, depicted in FIG. 11B, article of merchandise 70 is secured within retaining arms 68a, 68b, and 68c.

Figure 11C:
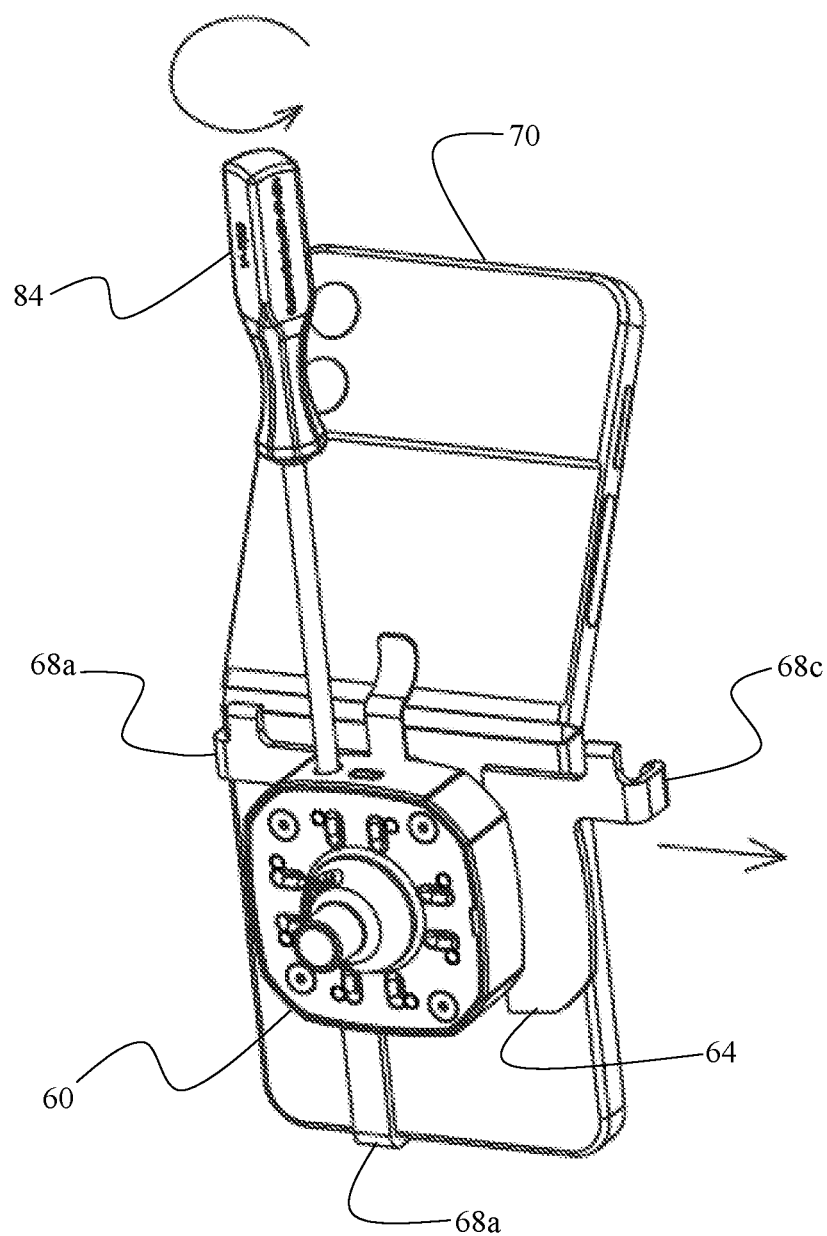
FIG. 11C is a perspective back view of the embodiment of the invention configured to secure a horizontally folding article of merchandise, depicting a tool inserted into an access port within the quick-release interface to retract the latch away from the latch plate, thereby unlocking the anti-theft device and releasing the article of merchandise therefrom.
Figures 12A, 12B:
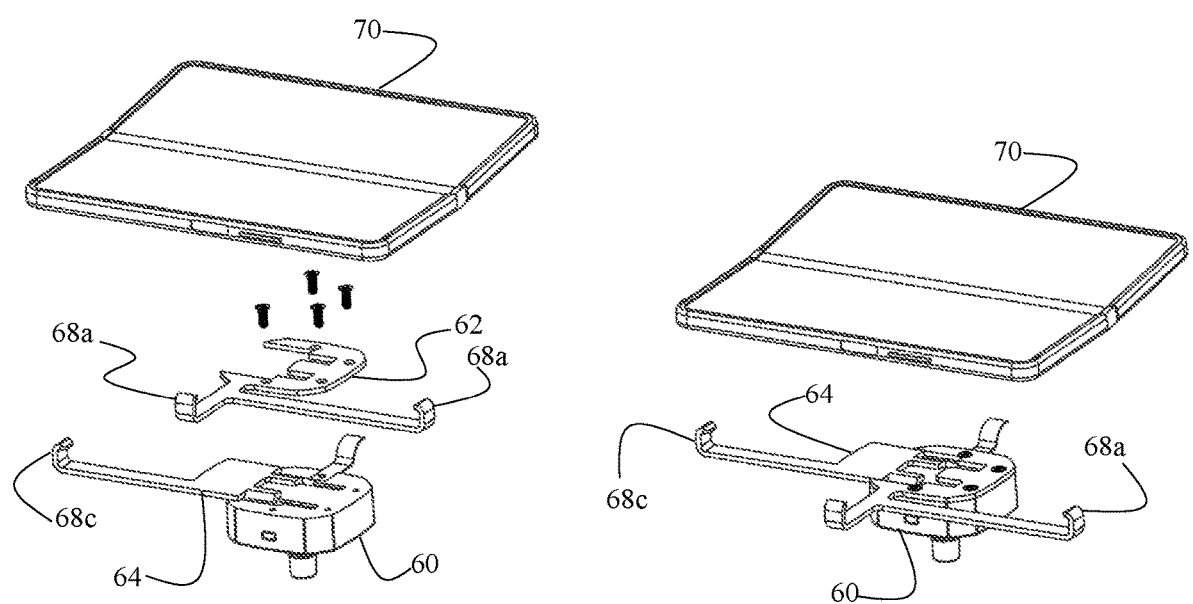
FIG. 12A is a perspective front view of the embodiment of the invention configured to secure a vertically folding article of merchandise, depicting the rails of the latch plate inserted into opening of longitudinal channels of the quick-release interface.
FIG. 12B is a perspective front view of the embodiment of the invention configured to secure a vertically folding article of merchandise, depicting the securing bracket affixed to the quick-release interface and the latch plate slidingly disposed within the longitudinal channels of the quick-release interface.
Figure 13C:
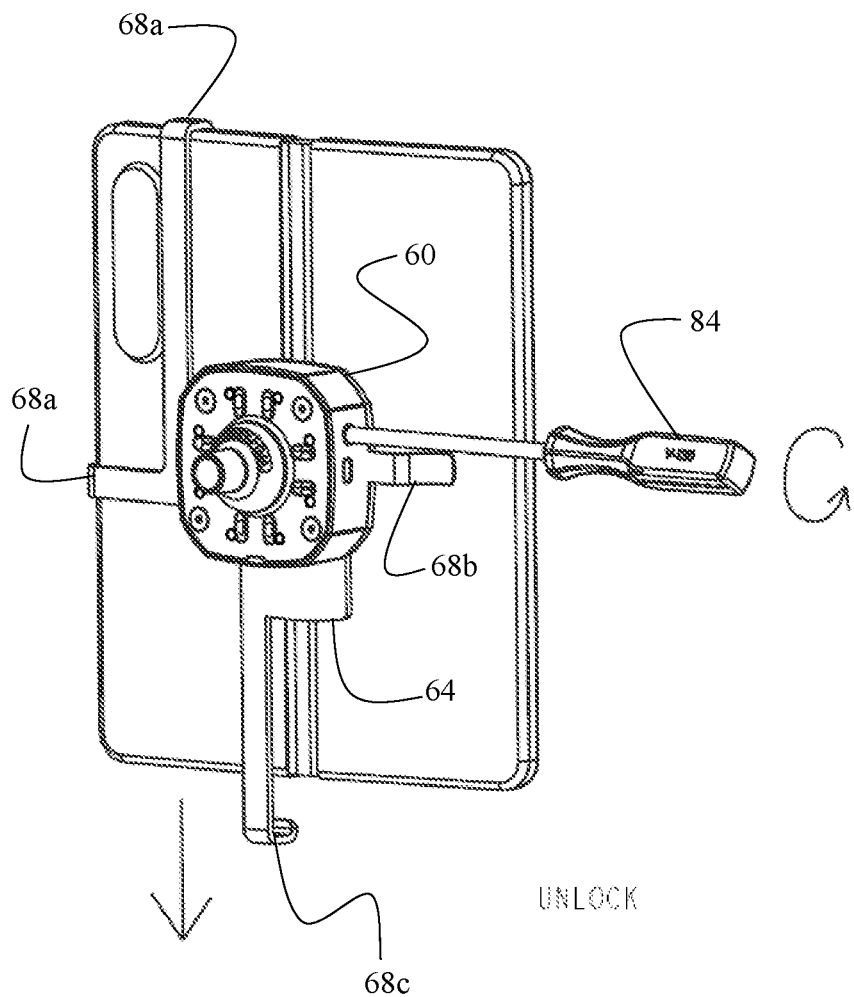
FIG. 13C is a perspective back view of the embodiment of the invention configured to secure a vertically folding article of merchandise, depicting a tool inserted into an access port within the quick-release interface to retract the latch away from the latch plate, thereby unlocking the anti-theft device and releasing the article of merchandise therefrom.

FIG. 11C depicts that, to release article of merchandise 70, a tool 84 is inserted into quick-release interface 60 via a designated port. Tool 84 engages torsion latch 80 and can be used to rotate latch 80 into its second position, in which teeth 82 exit notches of rails 72, thereby releasing latch plate 64. At this point, rails 72 can slide within channels 74 to retract retaining arm 68c of latch plate 64 away from article of merchandise 70. When the distance between retaining arms 68c of latch plate 64 and 68a of securing bracket 62 becomes greater than the width of article of merchandise 70, article of merchandise 70 can be removed from the anti-theft device.

FIGS. 12A-B and 13A-C depict that latch plate 64 and securing bracket 62 may be designed to accommodate a specific shape of a particular article of merchandise 70. In this manner, the anti-theft device can be readily adapted to secure differently shaped articles of merchandise 70 simply by changing the lengths and/or configurations of arms 68 of latch plate 64 and/or securing bracket 62.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. An anti-theft device for securing an article of merchandise, comprising:
    a pedestal affixed to a display counter;
    a securing bracket configured to receive one or more lateral sides of the article of merchandise therein;
    a latch plate configured to connect the article of merchandise to the pedestal, the latch plate having a rail disposed on a bottom surface thereof;
    a quick-release interface having a first surface configured to couple to the latch plate and a second surface configured to rest on the pedestal;
    a straight longitudinal channel disposed within the quick-release interface, the straight longitudinal channel having a flange extending linearly therealong and an opening configured to receive the rail of the latch plate, wherein the rail is configured to linearly translate within the longitudinal channel engaging the flange thereof; and
    a latch disposed within the quick-release interface, the latch having a first position and a second position, wherein in the first position, the latch is configured to engage the rail of the latch plate thereby immobilizing the rail against movement within the straight longitudinal channel, thus coupling the latch plate to the quick-release interface, and wherein in the second position, the latch disengages the rail of the latch plate thereby enabling the rail to linearly translate within the straight longitudinal channel such that the rail can exit the straight longitudinal channel via the opening thereby releasing the latch plate from the quick-release interface, wherein to release the latch plate from the quick-release interface, the latch must be transitioned into the second position.

2. The anti-theft device of claim 1, wherein the opening is disposed on a lateral side of the quick-release interface.

3. The anti-theft device of claim 1, wherein the opening is disposed on the first surface of the quick-release interface.

4. The anti-theft device of claim 1, wherein the rail has a lip configured to reside under the flange of the straight longitudinal channel when the latch plate is coupled to the quick-release interface, wherein the flange restricts the rail against exiting the straight longitudinal channel.

5. The anti-theft device of claim 1, wherein the quick-release interface has an access port providing access to the latch, such that the latch is accessible via the access port by a tool or a key, wherein operation of the tool or the key transitions the latch into the second position, thereby releasing the latch plate.

6. The anti-theft device of claim 1, wherein the rail has a notch configured to receive the latch therein, whereby when the latch resides within the notch, the rail is immobilized relative to the quick-release interface.

7. The anti-theft device of claim 6, wherein to couple the latch plate to the quick-release interface, the rail of the latch plate is configured to be inserted into the straight longitudinal channel and translated linearly therealong, whereby the rail is configured to engage the latch and transitions the latch into the second position, wherein upon the latch becoming aligned with the notch, the latch is configured to return to the first position and enter into the notch, thereby immobilizing the rail within the straight longitudinal channel.

8. The anti-theft device of claim 1, wherein a wireless charging pad is connected to the securing bracket, the wireless charging pad having a first electrical contact and the quick-release interface having a second electrical contact, the first electrical contact and the second electrical contact configured to establish an electrical connection with one another when the latch plate is coupled to the quick-release interface, wherein the wireless charging pad is configured to wirelessly provide electrical power to the article of merchandise.

9. The anti-theft device of claim 8, wherein electrical power is configured to be transferred from the pedestal to the quick-release interface when the quick-release interface is at rest on the pedestal.

10. The anti-theft device of claim 1, wherein the quick-release interface has a second longitudinal channel configured to receive and retain a second rail of the latch plate.

11. The anti-theft device of claim 1, wherein the latch plate comprises a first retaining arm configured to engage the article of merchandise.

12. The anti-theft device of claim 11, wherein the securing bracket comprises a second retaining arm, wherein the first retaining arm and the second retaining arm are configured to engage opposite lateral sides of the article of merchandise, and wherein translation of the latch plate relative to the quick-release interface transitions the first retaining arm between an open position, in which the first retaining arm and the second retaining arm are separated by a first distance exceeding a width of the article of merchandise, and a closed position in which the first retaining arm and the second retaining simultaneously engage opposite lateral sides of the article of merchandise.

13. The anti-theft device of claim 11, wherein the latch is configured to immobilize the latch plate relative to the quick-release interface, thereby restricting the first retaining arm from transitioning from a closed position to an open position.

14. The anti-theft device of claim 1, wherein the securing bracket is affixed to the quick-release interface.

15. An anti-theft device for securing an article of merchandise, comprising:
   a pedestal affixed to a display counter;
   a quick-release interface configured to removably rest on the pedestal, the quick-release interface having a top surface and a bottom surface, the bottom surface being configured to mate with the pedestal;
   a latch plate configured to couple to the top surface of the quick-release interface;
   a latch disposed within the quick-release interface, the latch having a first position and a second position, wherein in the first position, the latch is configured to engage the latch plate to lock the latch plate to the quick-release interface, and wherein in the second position, the latch disengages the latch plate thereby releasing the latch plate from the quick-release interface, wherein to release the latch plate from the quick-release interface, the latch must be transitioned into the second position; and
   one or more retaining arms configured to receive the article of merchandise therein, wherein the retaining arms cannot be manipulated to release the article of merchandise therefrom when the latch plate is locked relative to the quick-release interface.

16. The anti-theft device of claim 15, wherein the latch plate has a rail and the quick-release interface has a longitudinal channel configured to receive the rail, wherein in the first position, the latch is configured to engage the rail thereby preventing removal of the rail from the longitudinal channel.

17. The anti-theft device of claim 16, wherein the longitudinal channel has a first opening sized to permit passage of the rail therethrough, wherein the rail is configured to translate within the longitudinal channel.

18. The anti-theft device of claim 17, wherein the longitudinal channel comprises a flange and the rail comprises a lip, wherein the lip of the rail is configured to reside underneath the flange of the longitudinal channel such that the flange restricts the rail against exiting the longitudinal channel.

19. The anti-theft device of claim 15, wherein the quick-release interface has an access port providing access to the latch, such that the latch is accessible via the access port by a tool or a key, wherein operation of the tool or the key transitions the latch into the second position, thereby releasing the latch plate.

20. The anti-theft device of claim 15, wherein a wireless charging pad is connected to the securing bracket, the wireless charging pad having a first electrical contact and the quick-release interface having a second electrical contact, the first electrical contact and the second electrical contact configured to establish an electrical connection with one another when the latch plate is coupled to the quick-release interface, wherein the wireless charging pad is configured to wirelessly provide electrical power to the article of merchandise.

21. The anti-theft device of claim 20, wherein electrical power is configured to be transferred from the pedestal to the quick-release interface when the quick-release interface is at rest on the pedestal.

22. The anti-theft device of claim 15, wherein the latch plate comprises a first retaining arm configured to engage the article of merchandise.

23. The anti-theft device of claim 22, wherein a second retaining arm is affixed to the quick-release interface, wherein the first retaining arm and the second retaining arm are configured to engage opposite lateral sides of the article of merchandise, and wherein translation of the latch plate relative to the quick-release interface transitions the first retaining arm between an open position, in which the first retaining arm and the second retaining arm are separated by a first distance exceeding a width of the article of merchandise, and a closed position in which the first retaining arm and the second retaining simultaneously engage opposite lateral sides of the article of merchandise.

24. The anti-theft device of claim 23, wherein the latch is configured to immobilize the latch plate relative to the quick-release interface, thereby restricting the first retaining arm from transitioning from the closed position to the open position.

\* \* \* \* \*